United States Patent [19]

Mishima

[11] Patent Number: 5,073,098
[45] Date of Patent: Dec. 17, 1991

[54] VULCANIZING FLEXIBLE JACKET USED IN POWER TRANSMISSION BELT MANUFACTURE

[75] Inventor: Kyoichi Mishima, Kobe, Japan

[73] Assignee: Mitsuboshi Belting Ltd., Japan

[21] Appl. No.: 398,640

[22] Filed: Aug. 25, 1989

[30] Foreign Application Priority Data

Aug. 26, 1988 [JP] Japan .................................. 63-212786

[51] Int. Cl.⁵ ........................ B29C 35/04; B29D 29/08
[52] U.S. Cl. ..................................... 425/28.1; 156/87;
156/137; 156/382; 425/34.2; 425/506; 425/389;
425/393; 425/812; 425/818
[58] Field of Search ............... 425/812, 818, 501, 502,
425/505, 28.1, 506, 389; 264/315, 326, 102, 24;
156/138–140, 87, 137, 382

[56] References Cited

U.S. PATENT DOCUMENTS

| 1,392,576 | 10/1921 | Goodenberger | 156/87 |
| 2,489,322 | 11/1949 | Olsen et al. | 425/812 |
| 2,583,085 | 1/1952 | Campbell | 425/34.2 |
| 2,671,244 | 3/1954 | Freedlander | 425/28.1 |
| 2,678,468 | 5/1954 | Smith | 425/812 |
| 2,782,461 | 2/1957 | Esslinger | 425/812 |
| 2,790,205 | 4/1957 | Parker | 425/812 |
| 2,851,729 | 9/1958 | Kalkofen | 425/812 |
| 3,078,205 | 2/1963 | Sauer et al. | 264/326 |
| 3,251,914 | 5/1966 | Kesling | 425/388 |
| 3,418,186 | 12/1968 | Wetzel | 264/24 |
| 3,839,116 | 10/1974 | Thomas et al. | 156/138 |
| 3,932,078 | 1/1976 | Ellis et al. | 425/34.2 |
| 4,409,047 | 10/1983 | Brooks | 156/138 |
| 4,489,030 | 12/1984 | Brooks | 425/28.1 |
| 4,710,251 | 12/1987 | Borchardt | 425/818 |

FOREIGN PATENT DOCUMENTS

| 2647514 | 4/1978 | Fed. Rep. of Germany | 156/87 |
| 58-31733 | 2/1983 | Japan | 425/818 |
| 794860 | 5/1958 | United Kingdom | 156/140 |
| 2191974 | 12/1987 | United Kingdom | 425/501 |

Primary Examiner—Jeffery Thurlow
Assistant Examiner—Mathieu Margot
Attorney, Agent, or Firm—Wood, Phillips, Mason, Reckentenwald & Vansanten

[57] ABSTRACT

An improvement is provided in a jacket used in the formation/curing of transmission belts. Such a jacket typically has a substantially cylindrical surface which is engaged with assembled belt components during a curing process therefor. The improvement resides in the provision of vent structure for allowing air to escape from between the cylindrical surface on the belt forming jacket and assembled belt components during a curing process.

21 Claims, 2 Drawing Sheets

VULCANIZING FLEXIBLE JACKET USED IN POWER TRANSMISSION BELT MANUFACTURE

BACKGROUND OF THE INVENTION

1. Field of the Invention

This invention relates to power transmission belts and, more particularly, to a jacket utilized during the vulcanization of a belt sleeve and to a manufacturing method utilizing the novel jacket.

2. Background Art

It is common in the art to manufacture power transmission V-belts by initially forming and vulcanizing a belt sleeve, and then cutting a plurality of the belts out of the sleeve.

One such prior art method of manufacture is disclosed in U.S. Pat. No. 3,839,116, to Thomas et al. In Thomas et al, a matrix sleeve 37 is pre-formed with regular, axially spaced, circumferential grooves, corresponding to longitudinal ribs on a completed belt. The matrix sleeve 37 is disposed closely around a drum 44, having an outer surface with a right cylindrical configuration, so that the cylindrical shape of the matrix sleeve is thereby maintained. Belt components are then sequentially built up around the outer surface of the matrix sleeve 37. For example, in FIG. 5, a fabric layer 53, rib stock material 54, elastomeric platform material 55, and cushion material 56 are wrapped consecutively around the matrix sleeve 37, after which a load carrying cord 33 is wound under high tension against the underlying layers to thereby deform the underlying layers partially into the grooves defined by the matrix sleeve 37. As seen in FIG. 6, a top cushion layer 61, an outer layer 62 of elastomeric material, and a fabric layer 63 are wound in turn over the cord 33 to complete the uncured belt sleeve. The uncured belt sleeve is then placed in a vulcanizing unit, identified by Thomas et al as a pot heater, and subjected to steam under controlled temperature and pressure conditions to effect curing and/or vulcanization of the sleeve. The vulcanized sleeve is then cut, by circumferential scoring, to define individual ribbed V-belts.

Belt manufacture, by the structure and method disclosed in Thomas et al, has several drawbacks. First of all, in the high temperature and pressure curing environment, the tensile cords tend to migrate into the lower rubber layer, thereby causing inconsistent and improper positioning of the tensile cords along the belt length. The result of this may be premature failure of the belts.

Another problem contended with in Thomas et al, is that there may be air accumulation between the unvulcanized belt sleeve and rubber matrix during the vulcanization step. This air remains trapped during curing and results in localized pressure on the belt sleeve with resulting irregularities in the final belt shape. Such irregularities detrimentally affect the integrity of the belt.

Further, any air that is entrained in any of the belt components remains trapped therein. During vulcanization, there is no escape route for this air and resultingly the air pockets become permanently molded into the belt components. A sponge-like texture may result, which inherently weakens the belt. The presence of voids or depressions in belts, formed by the Thomas et al method, is common.

A method of belt manufacture similar to that in Thomas et al is disclosed in U.S. Pat. No. 4,409,047, to Brooks. Brooks' disclosure relates to the formation of laterally, rather than longitudinally, extending teeth and additionally to the formation of teeth on both sides of a belt. Brooks, like Thomas et al, utilizes an inner matrix 34 with integrally formed teeth 35 about which belt components are sequentially built. With all belt components in place, a curing jacket 36, with inwardly directed teeth 37, is placed in surrounding relationship with the belt components. The belt sleeve is cured as in Thomas et al.

In Brooks, the problem of air capture is even more vexatious than in Thomas et al's system. In Brooks, the jacket is made from a material that is compatible with and, during the vulcanization process, tends to adhere to, the outer surface of the tension section 23. There is no escape route for air in the component material and, as in Thomas et al, significant amounts of air present between the jacket 36 and tension section 23 during assembly of the jacket 36 become, after curing, an integral part of the belt sleeve, as voids, which weaken the belt.

An alternative, known method of forming transmission belts is disclosed in U.S. Pat. No. 3,822,516, to Huber. Huber teaches the formation of power transmission belts in an inverted orientation. That is, the teeth are formed on the outside of a belt sleeve and, after the individual belts are cut from the belt sleeve, the belts are twisted inside out.

More specifically, Huber provides a cylindrical belt drum 20, having an outer surface with a right cylindrical configuration, to which an expandable tubular member 25 is releasably attached. The transmission belt elements are sequentially built upon the tubular member 25 to form a belt sleeve 24, which is then vulcanized, as in Thomas et al and Brooks, described above. The vulcanized belt sleeve is then ground by means of a rotating wheel to define, in the case of the FIG. 5 belt, a plurality of longitudinally extending belt ribs.

The inverted belt sleeve manufacture method of Huber alleviates the problem of irregular arrangement of tensile cords resulting from the migration of those cords during the vulcanization process, as occurs in both the Thomas et al '116 and Brooks '047 patents. However, air buildup in the Huber structure remains a serious problem. The inverted belt sleeve has an exposed, elastomeric material at its radially outermost surface, which tends to bond with an adjacent curing jacket to fix air pockets in the belt components and prevent escape of any air present between the sleeve 24 and jacket.

Further, there is the same tendency of the sleeve 24 to bond to the tubular member 25 during the vulcanization step with the same detrimental effect—i.e. inconsistent rib shape due to the presence of voids and depressions from trapped air.

SUMMARY OF THE INVENTION

The present invention is specifically directed to overcoming the above enumerated problems in a novel and simple manner.

According to the invention, an improvement is provided in a jacket used in the formation/curing of transmission belts. Such a jacket typically has a substantially cylindrical surface which is engaged with assembled belt components during a curing process therefor. The improvement resides in the provision of vent structure for allowing air to escape from between the cylindrical surface on the belt forming jacket and assembled belt components during a curing process.

With the inventive structure, detrimental air buildup and capture between the jacket and belt components is prevented. This results in uniformly produced, high integrity belts.

To optimize the escape route for air between the belt components and jacket, several variations of groove(s) in the cylindrical surface of the jacket are contemplated. The groove may take a linear form extending between the axial ends of the jacket. Alternatively, the jacket surface can have a spiral groove, a curved groove, a circumferential groove, or various combinations of the above grooves. Other groove configurations are within the contemplation of the present invention.

The groove depth and width are preferably in the range of 1/20th to 1/5th of the radial thickness of the jacket. If the groove dimensions are less than the lower dimension, there is a tendency, during vulcanization, for the belt component material to flow into the groove and thereby block air communication therethrough. If the groove is deeper than the upper dimension, there may be a tendency of the component material to flow into the groove sufficiently that there is detrimental deformation of the belt.

Another aspect of the invention is the provision of an exhausting system, which includes a conduit communicating the space between the jacket and belt sleeve and a point externally of a housing used to contain the jacket during vulcanization. In a preferred form of the invention, the belt components are formed around the outer surface of a drum, which surface has a generally right cylindrical configuration. The drum and jacket cooperatively enclose a space within which the belt components reside. At at least one axial end of the belt sleeve is an annular chamber, which communicates with the groove(s). The exhausting conduit communicates with the annular chamber and a point externally of the housing. Preferably, there is an annular chamber at each axial end of the belt sleeve and the exhausting conduit communicates between each annular chamber and the external point.

The invention also contemplates a method of forming a power transmission belt sleeve consisting of the steps of providing a drum with a cylindrical outer surface, assembling belt components around the outer surface of the drum to define a belt sleeve, disposing a jacket around the belt sleeve, vulcanizing the belt sleeve and exhausting air from between the belt sleeve and jacket during the vulcanizing step.

DETAILED DESCRIPTION OF THE DRAWINGS

Figure 1:
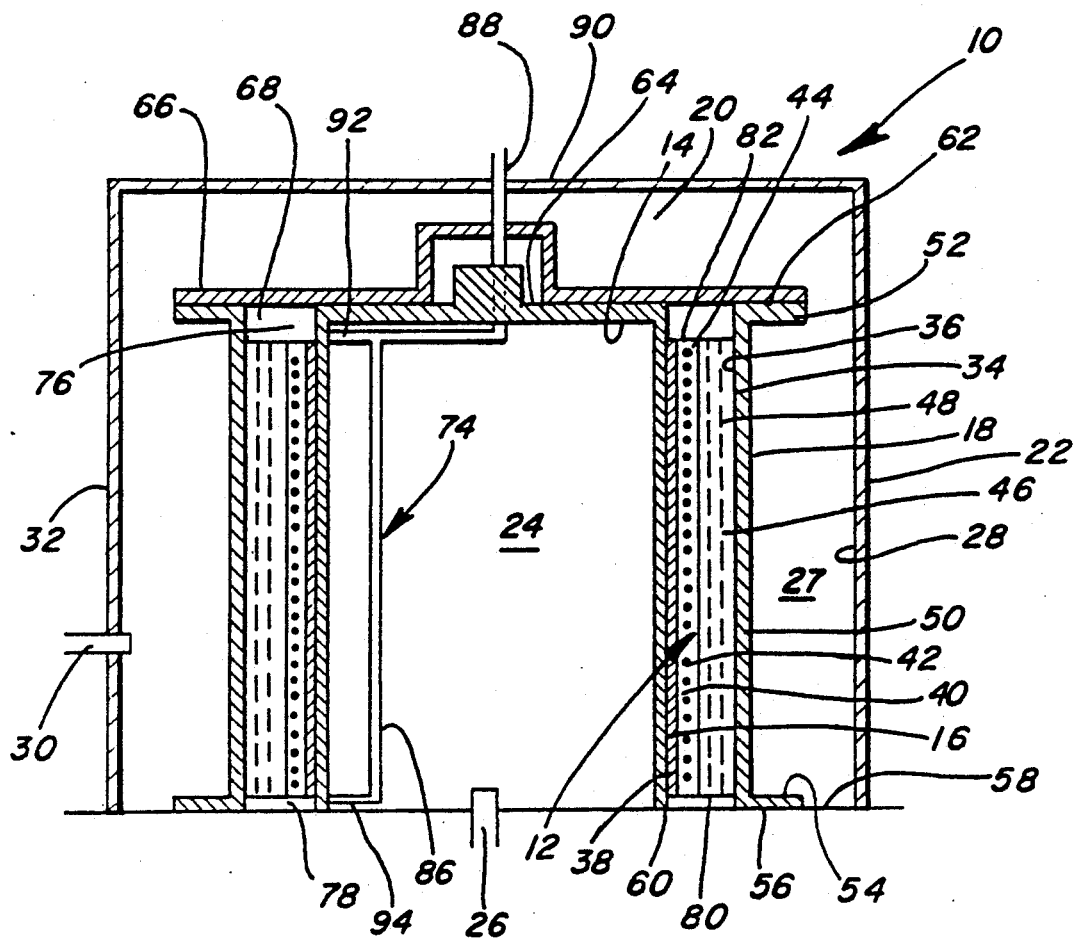
FIG. 1 is a cross sectional view of a curing/vulcanization system having a belt sleeve therein to be cured.

In FIG. 1, a system is shown at 10 for curing/vulcanizing a transmission belt sleeve, shown at 12. The belt sleeve 12 is held in place in FIG. 1 by reason of its disposition about a metal drum 14. To form the belt sleeve 12, the individual belt components, as described in detail hereafter, are sequentially built up around a cylindrical outer surface 16 of the drum 14. A sleeve-like jacket 18 is situated to surround the belt sleeve 12 prior to a curing/vulcanizing step, which is performed within the space 20 bounded by a housing 22.

Curing/vulcanization of the belt sleeve 12 is carried out in conventional manner by exposing the belt sleeve to steam introduced to the space 20 at controlled, elevated temperatures and pressures. The vulcanizing fluid is introduced to the hollow 24 of the drum 14 through a conduit 26, preferably at a pressure of 4.0-6.0 Kg/cm². Additional vulcanizing fluid is introduced to the region 27 between the inner surface 28 of the housing 22 and the jacket 18 through a conduit 30 in the peripheral wall 32 of the housing 22 at a pressure of 7.5-9.5 Kg/cm².

The present invention is specifically directed to preventing entrapment of air in the components of the belt sleeve 12 in a system such as that in FIG. 1 and, more particularly to structure for venting air that would be otherwise trapped in the belt sleeve 12, or between the sleeve 12 and jacket 18, to a point externally of the housing 22 during a curing and/or vulcanization process.

The common problem of migration of tensile cords into the compression section of a belt is alleviated by forming the belt sleeve 12 in inverted form about the drum 14. This exposes the radially innermost belt surface 34 directly to the inner, cylindrical surface 36 of the jacket 18. Because the composition of the belt surface 34 and jacket 18 are similar, there is tendency of these two surfaces to bond during curing and/or vulcanization which results in the capture of air therebetween with a resulting deformation of the belt sleeve 12.

Before describing the novel aspects of the invention, a description of the formation of an exemplary belt sleeve is in order. It should be understood that the described belt sleeve is only exemplary of one type of belt configuration, and the invention contemplates use with virtually a limitless number of belt sleeve configurations.

Figure 3:
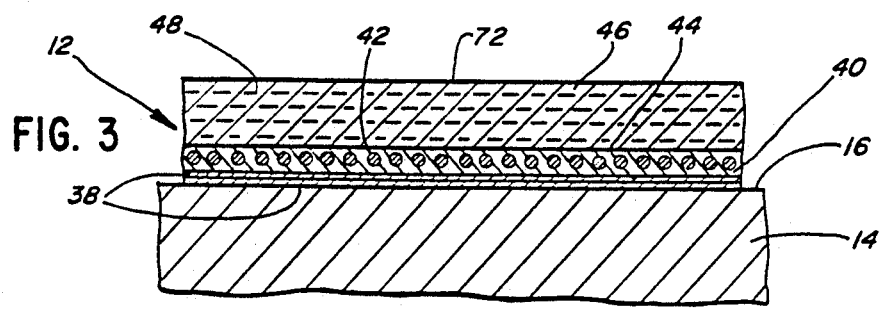
FIG. 3 is an enlarged, section view of the belt sleeve in the system of FIG. 1.

As seen in FIGS. 1 and 3, the components of the belt sleeve 12 are sequentially built on to the outer surface 16 of the drum 14. The drum 14 is made preferably from iron or other rigid material that will maintain its shape under the conditions encountered within the housing 22. The first layer wrapped around, and directly against, the drum 14 is a rubber coated fabric 38 consisting of warp and weft yarns. The warp and weft yarns may both be cotton or synthetic or combinations thereof. The warp and weft yarns intersect preferably at an angle of 90°-155°, and are oriented so as not to be aligned with the length of the belt. At least one layer of fabric 38 is provided, and in the described embodiment two layers are shown. On top of the fabric layer(s) a cushion rubber sheet 40 is disposed. The rubber sheet is composed of any of the following rubber materials or a suitable blend thereof: NR (Natural Rubber), CR (Chloroprene Rubber), IIR (Isobutene-Isoprene Rubber) and BR (Butadiene Rubber). Around the rubber sheet 40, a low elongation, high strength tensile cord 42 is wound under constant, high tension. Preferably, the cord material is nylon, polyester, Kevlar, or glass fiber. A separate rubber sheet 44, and with preferably the same composition as the rubber sheet 40, is disposed over the tensile cords 42. Finally, a rubber sheet 46 is disposed over the layer 44 to define the belt compression section. Short fibers 48 are dispersed in the compression rubber sheet 46 and are aligned axially of the belt sleeve so that in the completed belt the fibers extend generally parallel to each other and laterally of the belt.

Once the components of the belt sleeve 12 are in place, the jacket 18 is situated in surrounding relationship with the sleeve 12. The jacket 18 has a cylindrical body 50 with radially outturned, axially spaced, upper and lower flanges, 52, 54 respectively. The lower jacket flange 54 has a flat surface 56 which facially engages an upwardly facing, flat surface 58 at the bottom of the housing 22. The annular bottom surface 60 of the drum 14 rests on the same surface 58. With the jacket in place, the upwardly facing flat surface 62 on the upper jacket flange 52 is coplanar with the upwardly facing, flat upper surface 64 of the drum 14. A lid 66 is placed on top of the drum 14 and jacket 18 and is supported cooperatively by the upper jacket surface 62 and the upper lid surface 64 so as to seal an annular space 68 defined between the drum 14 and jacket 18 and within which the belt sleeve 12 resides.

Figures 4, 5, 6:
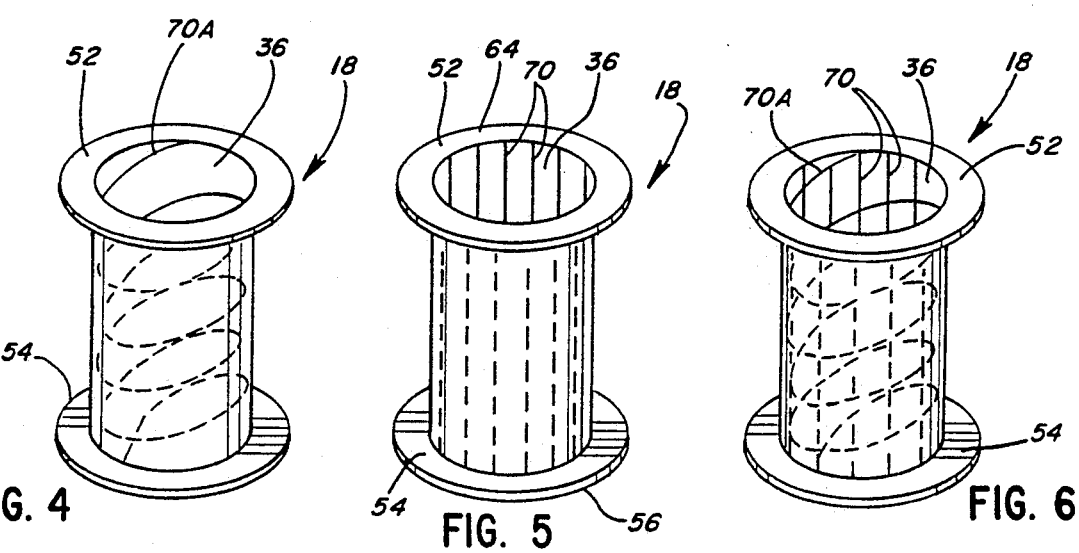
FIG. 4 is a schematic perspective view of a jacket, used in the curing/vulcanization apparatus of FIG. 1, according to the present invention.
FIG. 5 is a schematic perspective view of a modified form of jacket.
FIG. 6 is a schematic perspective view of a further modified form of jacket.

According to the invention, venting grooves 70 (FIG. 5) are formed in the inner surface 36 of the jacket 18. FIGS. 4-8 show variations of jacket grooves according to the present invention. The grooves 70 in the jacket 18 in FIG. 5 will initially be described to illustrate the function of the grooves 70. The grooves 70 in FIG. 5 are substantially straight and extend axially of the jacket 18. The grooves 70 are spaced equidistantly about the circumference of the inside jacket surface 36. Each groove 70 preferably extends axially the entire length of the jacket—that is, from the bottom surface 56 of the lower flange 54 to the upper surface 64 of the upper flange 52.

The grooves 70 vent air that is otherwise trapped between the radially innermost surface 72 on the belt sleeve 12 and the jacket inside surface 36. Because the flexible jacket is preferably made up from a heat- and oxidation-resistant compound such as IIR (Isobutene-Isoprene Rubber) NBR (Nitrile-Butadiene Rubber), EPT (Ethylene Propylene Terpolymer), there is a tendency of the jacket 18 and belt sleeve 12 to adhere to each other during the curing/vulcanization process. In the absence of the grooves 70, any air between the belt sleeve 12 and jacket 18 would be permanently formed into the belt sleeve 12 or deform the belt sleeve 12. With the inventive jacket 18, however, the air between the belt sleeve 12 and jacket 18 is squeezed into the grooves 70 and escapes to a point axially beyond the belt sleeve 12. Further, any air pockets, bubbles, etc. entrained in the belt components can likewise escape from the belt sleeve 12 into the grooves 70 and away from the sleeve 12. A high integrity belt, without voids, depressions, etc. results.

Preferably, the grooves 70 have a width and depth in the range of 1/20th to 1/5th of the radial thickness of the jacket 18. For maximum efficiency, the range is between 1/15th to 1/10th of the jacket thickness. If the width and depth of the grooves 70 are less than 1/20th of the jacket thickness, the rubber 46 of the compression layer may, during curing/vulcanization, be urged into and block the groove altogether or diminish its venting capacity. If the groove width and depth are greater than 1/5th of the jacket thickness, rubber 46 in the compression layer may flow into the groove 70 sufficiently that the belt sleeve 12 is appreciably deformed that the end belt product has an irregular shape. The movement of the compression rubber 46 into the grooves 70 can also cause the fibers 48 embedded therein to change orientation and to become randomly, or irregularly, aligned at other than their desired lateral orientation.

Figure 2:
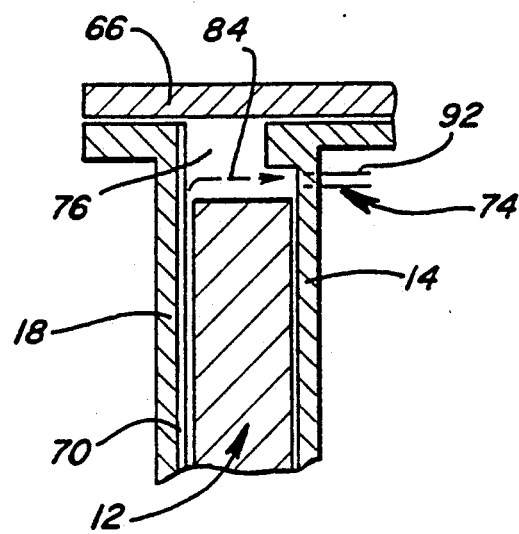
FIG. 2 is an enlarged, fragmentary view of the upper section of the curing/vulcanization system of FIG. 1.

To purge the system 10 of air conveyed through the grooves 70, an exhaust system is provided at 74. The exhaust system 74 cooperates with annular, accumulation chambers 76, 78 at the top and bottom, respectively, of the annular space 68 defined between the sleeve 12 and jacket 18. The chambers 76, 78 are defined by limiting the axial extent of the belt sleeve 12 so that the axial bottom edge 80 of the belt sleeve is spaced above the surface 58 and the top 82 of the belt sleeve is spaced beneath the lid 66. In FIG. 2, arrow 84 indicates the path of air through one of the grooves 70 and into the chamber 76.

The exhaust system 74 consists of a conduit 86 having a portion 88 extending from the drum hollow 24 consecutively through the top of the drum 14, the lid 66 and top wall 90 of the housing 22. The conduit 86 has a first branch 92 which communicates with the chamber 76 and a second branch 94 in communication with the chamber 78.

Figures 7, 8:
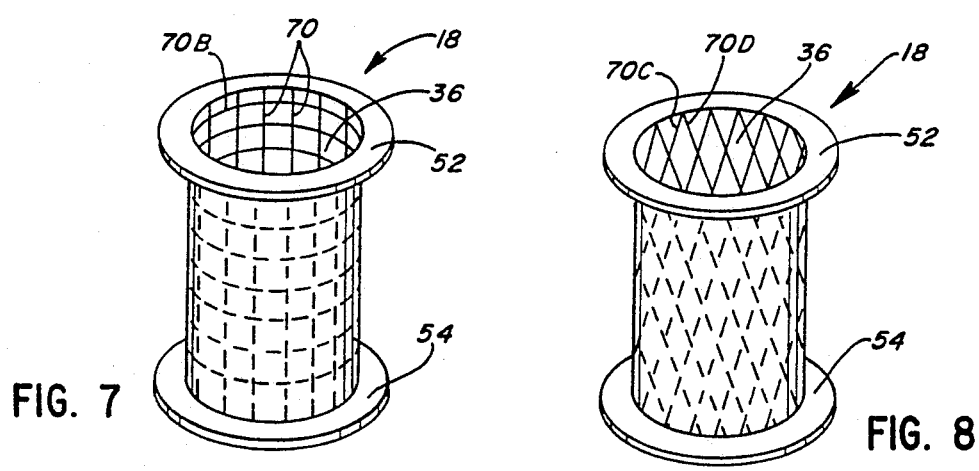
FIG. 7 is a schematic perspective view of a further modified form of jacket.
FIG. 8 is a schematic perspective view of a still further modified form of jacket.

Various arrangements for the grooves 70 are shown in FIGS. 4, 6, 7 and 8. The principal goal in the groove design is to provide a network wherein air throughout the entire extent of the belt sleeve 12 can be vented through the grooves for appropriate exhaustion from the system 10. In FIG. 4, a spiral groove 70A extends through the entire axial extent of the jacket 18. In FIG. 6, a combination of the axial grooves 70, shown in FIG. 5, with a spiral groove 70A, is shown. In FIG. 7 circumferential grooves 70B, spaced at regular intervals axially of the jacket 18, are provided in conjunction with the axial extending grooves 70, as those in FIG. 5. In FIG. 8, crossing, curved grooves 70C, 70D are provided in such a manner as to cooperatively define a diamond shaped pattern on the wall surface 36.

Figure 9:
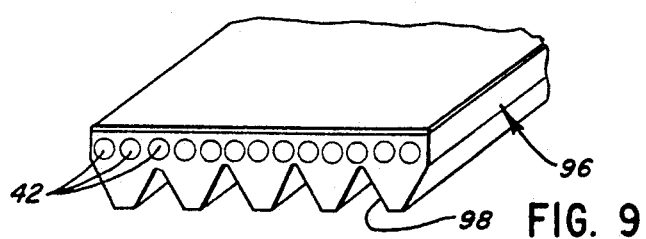
FIG. 9 is a perspective view of a section of an exemplary ribbed V-belt of the type capable of manufacture according to the present invention.

Once the belt sleeve 12 is vulcanized in the system 10, the lid 66, jacket 18, drum 14 and housing 22 are disassembled to release the belt sleeve 12. The belt sleeve can then be placed upon an expansible drum (not shown) on which it can be circumferentially scored by a grinder to divide the sleeve 12 into a number of belts. A grinder (not shown) can also be used to define longitudinal grooves in the compression portion of each belt 96, as shown in FIG. 9.

It is also possible, according to the present invention, to provide a flexible, elastic sleeve on the periphery of the drum 14, upon which sleeve the belt components can be directly wrapped to produce the belt sleeve 12. With this arrangement, it is possible to cut and/or form grooves 98 in the belt sleeve directly upon the drum 14, with the sleeve serving as a cushion layer to prevent damage to the drum 14.

The foregoing disclosure of specific embodiments is intended to be illustrative of the broad concepts comprehended by the invention.

I claim:

1. An improved jacket used to form power transmission belts, said jacket being of the type having a substantially cylindrical surface which is engaged with assembled belt components during a curing process for curing the belt components, said belt components conforming to the cylindrical jacket surface during a curing process, the improvement comprising:

vent means integrally formed with said jacket for allowing escape of air from between the cylindrical surface on the belt forming jacket and the assembled belt components with the belt components fully conformed to the cylindrical surface to thereby prevent air buildup between the jacket and fully conformed belt components that contributes to irregular belt formation during a curing process, wherein the jacket has axial ends and the vent means comprises at least one spiral groove formed in the cylindrical jacket surface and communicating between the axial ends of the jacket.

2. The improved belt forming jacket of claim 1 wherein said vent means comprises a plurality of grooves formed in the cylindrical surface and each extending between the axial ends of the jacket.

3. The improved belt forming jacket of claim 1 wherein there is a second groove that extends substantially in a straight line between the axial ends of the jacket.

4. The improved belt forming jacket of claim 1 wherein there are a plurality of grooves formed in the cylindrical surface and extending in substantially straight, parallel lines between the axial ends of the jacket.

5. The improved belt forming jacket of claim 1 wherein there are a first plurality of grooves formed in the cylindrical surface and extending in substantially straight parallel lines between the axial ends of the jacket and there are a second plurality of axially spaced circumferential grooves formed in the cylindrical surface and intersecting said first plurality of grooves.

6. The improved belt forming jacket of claim 1 wherein there are a plurality of curved grooves formed in the cylindrical surface and extending between the axial ends of the jacket.

7. The improved belt forming jacket of claim 1 wherein there are a plurality of intersecting curved grooves formed in the cylindrical surface and extending between the axial ends of the jacket.

8. The improved belt forming jacket of claim 1 wherein said belt jacket has a radial thickness and the groove has a depth and width in the range of 1/20 to 1/5th of the radial jacket thickness.

9. The improved belt forming jacket of claim 1 wherein said belt jacket has a radial thickness and the groove has a depth and width at least equal to 1/20th of the radial jacket thickness.

10. The improved belt forming jacket of claim 1 wherein said belt jacket has a radial thickness and the groove has a depth and width in the range of 1/15th to 1/10th of the radial jacket thickness.

11. The improved belt forming jacket of of claim 1 wherein said belt jacket has a radial thickness and the groove has a depth and width no greater than 1/5th of the radial jacket thickness.

12. The improved belt forming jacket of claim 1 in combination with a belt forming drum around which belt components are assembled to define a jacket, said jacket and drum cooperatively enclosing a space sealed from the ambient environment and within which the assembled belt components reside, there being means for exhausting air from said space.

13. The combination according to claim 12 wherein said exhausting means comprises a conduit extending through a portion of said drum and communicating with said space.

14. The combination according to claim 13 in combination with a vulcanization housing which contains the drum and jacket, said conduit communicating between said space and a point externally of said vulcanization housing.

15. The combination according to claim 13 wherein said conduit communicates with said space at a first point adjacent one axial end of the jacket and a second point adjacent the other axial end of the jacket.

16. A belt curing apparatus comprising:

a forming drum having a cylindrical outer surface around which belt components are assembled to define a belt sleeve; and a jacket for surrounding the drum and having a cylindrical surface of a diameter greater than the diameter of the outer drum surface to define a surface to which the belt components conform to define a final belt sleeve shape and axially spaced ends, said jacket having vent means integrally formed into said jacket for allowing the escape of air from between the jacket and belt components on the drum with the belt components conformed to the final shape thereof to thereby prevent air buildup that contributes to irregular belt formation during a curing process, said vent means comprising at least one curved groove communicating between the axially spaced ends of the jacket.

17. The belt cure apparatus according to claim 16 wherein with belt components on the drum there is an annular space defined radially between the drum and jacket at an axial end of the jacket and said groove communicates with said annular space.

18. The belt cure apparatus according to claim 16 including a housing which contains the drum and jacket and means are provided for exhausting air from between the jacket and drum to a point externally of said housing.

19. The belt cure apparatus according to claim 17 wherein there is an annular spaced radially between the drum and jacket at each axial end of the jacket and said groove communicates with each said annular space.

20. The belt cure apparatus according to claim 19 including means for exhausting air from at least one said annular space.

21. The belt cure apparatus according to claim 16 wherein said jacket has a radial depth and the groove has a depth and width in the range of 1/20th–1/5th of the radial thickness of the jacket.

* * * * *